Patented Apr. 9, 1929.

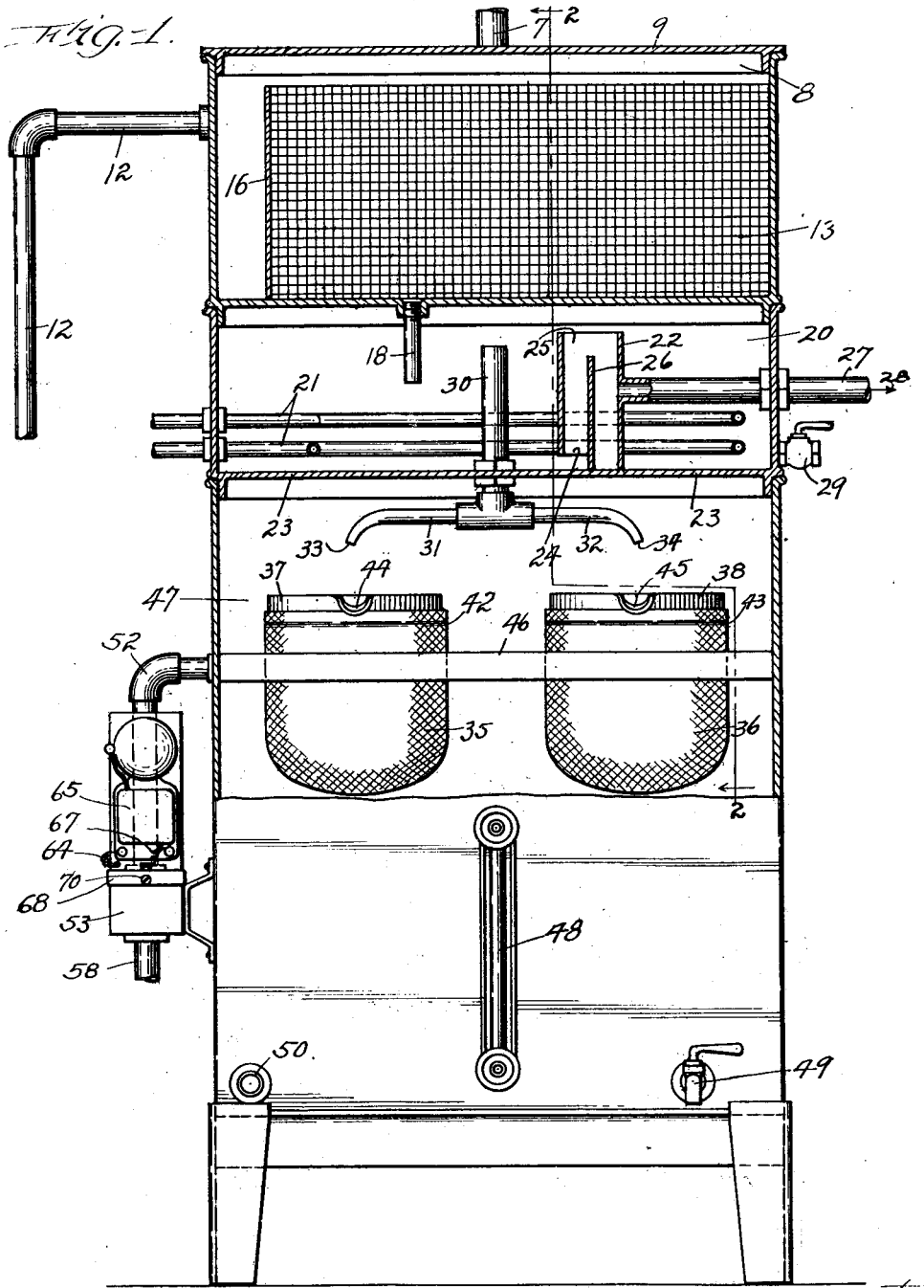

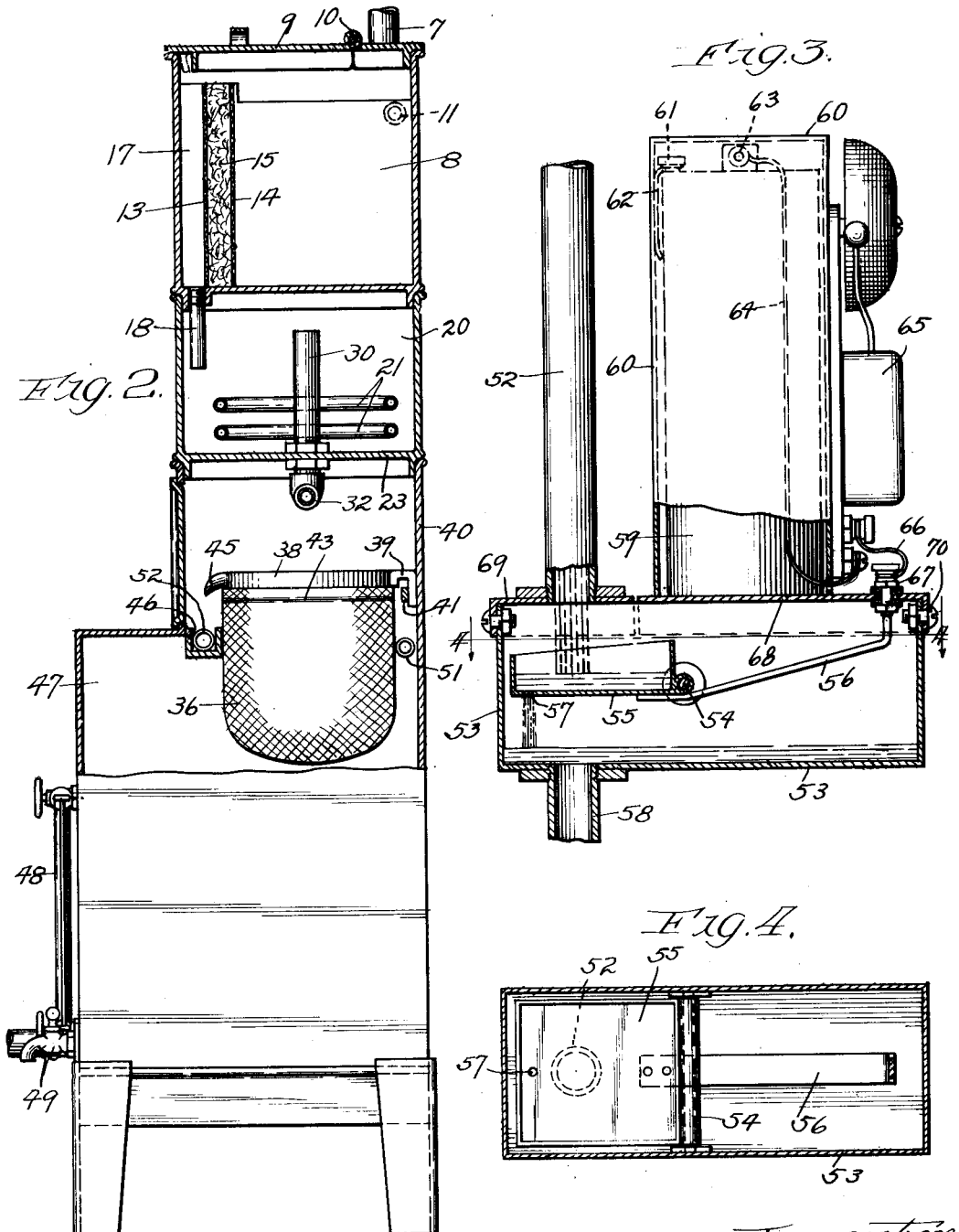

1,708,235

UNITED STATES PATENT OFFICE.

WILLIAM W. NUGENT, OF CHICAGO, ILLINOIS.

OVERFLOW ALARM FOR FILTERS.

Application filed July 2, 1920. Serial No. 393,575.

My invention relates to mechanism for automatically giving an alarm upon the overflow of liquids being filtered in filtering apparatus, and is particularly adaptable to oil filtering mechanism, although it may have a general application.

One of the objects of my invention is the provision of mechanism for automatically calling the attention of an attendant to the fact that liquid in filtering apparatus is overflowing when such overflowing occurs.

More particularly it is the object of my invention to provide, in combination with filtering bags of oil filtering apparatus, means for directing the overflowing oil, when the bags become clogged with foreign material, to a chamber provided with mechanism for receiving the overflowing oil and automatically ringing a bell or giving some other indication to an attendant that the filtering apparatus needs attention, and particularly that one or more filtering bags should be removed and replaced by clean ones.

Other objects of the invention will appear hereinafter, the novel features and combinations of elements being set forth in the appended claims.

Referring to the accompanying drawings—

Fig. 1 is a front elevation partly in section of filtering apparatus to which my improvement is particularly applicable;

Fig. 2 is a side elevation, partly in section, of the apparatus shown in Fig. 1, the sectional portion of Fig. 2 being taken on line 2—2 of Fig. 1;

Fig. 3 is an enlarged side view, partly in section, showing my improved signaling device; and Fig. 4 is a view taken on line 4—4 of Fig. 3.

While my invention may have a general application, it is particularly adaptable to oil filtering apparatus, either of the stationary type or automatic system type, and in which filtering bags are employed which may overflow when the filtering material thereof becomes clogged with the material filtered from the lubricating material. My improvement is particularly useful in an automatic filtering system for filtering lubricant which has been used for lubricating an engine and re-supplying the filtered lubricating material to the engine. In such automatic lubricating systems for engines the filtering elements, such as filtering bags, are usually in the upper portion of the tank containing the filtered lubricant or in a chamber immediately above such tank so that if the filtering element overflows there is danger of unfiltered material mixing with the filtered material. By supplying such an automatic lubricating and filtering system with overflow mechanism, not only may the overflowing lubricant be prevented from mixing with the filtered lubricant, but the overflowing lubricant may be used as a medium for operating an automatic alarm which will call the attention of the engineer to the fact that one or more of the filtering elements demand attention. Such overflow mechanism and the indicating means thereof also permit the use of the filtering elements to their full capacity; that is to say, the filtering elements do not have to be moved for purpose of cleaning them until such cleaning is necessary, as indicated by the overflow and the alarm given thereby.

In Figs. 1 and 2, I have shown filtering apparatus which may be used either in an isolated location or in an automatic lubricating system for engines, the lubricant to be filtered entering through the upper pipe 7 into the uppermost chamber 8 which is provided with a cover 9 hinged at 10, and an overflow opening 11 to which is connected an overflow pipe 12. The oil in the chamber 8 may pass through the vertical filtering wall comprising the vertical spaced-apart screens 13 and 14 with filtering material 15 between them. At the left-hand end of the filtering wall is a vertical partition 16 to form a compartment 17 into which the oil flows as it passes from the compartment 8 through the vertical filtering wall.

Depending from the compartment 17 is a pipe 18 for directing partially filtered oil into the intermediate compartment 20 of the filtering apparatus. This compartment may be provided with heating pipes shown at 21.

The compartment 20 is provided with water separating mechanism comprising a four-wall appliance 22 secured to the bottom 23 of the intermediate tank. This water separating appliance 22 is provided with a lower opening at 24 and an upper opening at 25 and a partition 26 so that the water in the oil will sink to the bottom of the intermediate tank and flow through the opening 24 into the water separating appliance and thence over the upper edge of the partition 26 into the pipe 27 outside of the filtering apparatus, as indicated by the arrow 28. A valve 29 normally closed is provided at the lower outer side of the intermediate tank so that such tank may be cleaned in any manner desired and the valve 29 opened to let the undesired material flow out.

Projecting upwardly through the bottom 23 of the intermediate tank into the chamber 20 is a vertical oil intake pipe 30 with its upper end above the upper edge of the partition 26 and below the upper end of the opening 25 in the water separating appliance 22. The oil floating on the water in the chamber 20 will flow into the vertical pipe 30 and downwardly along the branch pipes 31 and 32 to the nozzles 33 and 34 so that the oil which has been partially filtered by the filtering wall in the uppermost tank and from which the water has been separated in the intermediate tank may be further filtered by the cloth bags 35 and 36 which are supported respectively by the metal rings 37 and 38 each provided with an angular extension, such as shown at 39 in Fig. 2, so as to be capable of being detachably connected to the back plate 40 by fitting into a vertical slot formed by the member 41 being secured to the back plate 40. It should be understood that each of the rings 37 and 38 has rigidly connected thereto or formed integrally therewith such an angular member as that indicated at 39 in Fig. 2 with the vertical arm adapted to fit in the slot of the holder 41 so that the said rings may be held with their upper surfaces in a substantially horizontal plane. When desired, either of the rings 37 or 38 with the bags 35 and 36 attached thereto may be removed from the filtering apparatus through suitable doorways provided for that purpose, and this may be done when the bags are nearly full of lubricating material. Preferably the rings 37 and 38 are provided with annular grooves to receive flexible material indicated at 42 and 43 for tying the bags 35 and 36, respectively, to the rings 37 and 38.

Each of the rings 37 and 38 is also provided with an overflow spout shown at 44 and 45 so that when the filtering bags become clogged with so much foreign material that the lubricant would tend to overflow the bags, the spouts will direct the excess of oil in the bags into the substantially horizontal trough 46 located immediately below the spouts 44 and 45. It should also be noted that the bottoms of the spouts are in substantially the same horizontal plane located approximately at the upper ends of bags but an appreciable distance below the upper horizontal surfaces of the rings 38 and 37. Therefore before the oil has any opportunity of actually overflowing into the oil supply tank or chamber 47 it will flow out of the spouts 44 and 45 into the trough 46 which extends transversely of the upper portion of the chamber 47.

The chamber 47 is provided with a sight-tube 48 for indicating the depth of the filtered oil in the supply tank 47. A spigot 49 is provided in the lower right-hand front portion of the supply tank 47 so that when desired filtered oil may be withdrawn from the supply tank 47. At the lower left-hand corner of the supply tank 47 is a pipe 50 which is particularly adapted to be connected to an engine oiling system when the filtering apparatus is embodied in an automatic oiling and filtering system for engines. The supply tank 47 may also be provided with an overflow pipe 51 which may be connected to the vertical overflow pipe 12 which leads downwardly from the upper portion of the uppermost tank, as shown in Fig. 1.

The trough 46 is connected to a pipe 52 for directing overflowing oil into a tank 53 attached to one side of the supply tank 47 in any desirable manner, such as shown in Fig. 1. This tank 53 is provided with a pivot shaft 54 upon which is mounted a pan 55. The arrangement of shaft 54 and pan 55 is such that oil dropping from pipe 52 will fall directly into pan 55. The shaft 54 and pan 55 have an arm 56 extending therefrom and providing an electrical contact for an electrical circuit, to be described later. The arm 56 is preferably heavier than pan 55 so that when there is no oil in pan 55 arm 56 will be the heavier and hold the pan 55 up against the top of tank 53. The pan 55 is provided with a small opening 57 and this opening is considerably smaller than the pipe 52 so that after the oil has ceased overflowing through pipe 52 the oil remaining in pan 55 will run out through the opening 57, thereby permitting the arm 56 to draw the pan back up toward the top of the tank 53. A discharge pipe 58 is connected with the bottom of tank 53.

I have indicated a source of electricity, which in the present instance is a dry cell 59 disposed on the top of tank 53. I have also indicated a housing 60 around the battery 59, and the housing 60 and tank 53 should be of electrical conducting material so as to conduct the current from pole 61 through a contact spring 62 to the housing 60 and thence through the tank 53 to shaft 54 and arm 56. The other pole 63 of the battery 59 is connected by means of a wire 64 with some form of electrical signaling apparatus, such as the bell 65. The bell 65 is connected by means of a wire 66 with an electrical contact 67 mounted in the lid of tank 53. The contact member 67 is insulated from the tank 53 in any desirable manner. The free end of arm 56 is arranged to engage contact 67 when oil falls in pan 55, and when the oil has drained out of pan 55 the weight of arm 56 disconnects the latter from contact 67, breaking the circuit. Arm 56 and contact 67 therefore constitute an automatic electric switch.

As a means for providing easy access to the interior of tank 53 I have indicated the top of said tank as being made up of two parts 68 and 69. Pipe 52 is threaded in part 69 so that this part need not be removed to gain access to the interior of the tank. The part 68 is provided with a screw 70 for holding it on the top of the tank so that by removing the screw, part 68 and the other parts of the device connected therewith can be removed.

In operation, when oil runs over the sacks 35 and 36 from any cause, such as the sacks becoming stopped, such overflowing oil flows through spouts 44 and 45 into trough 46, and from thence through pipe 52 into tank 53, dropping into pan 55. This oil in pan 55 moves arm 56 up into engagement with contact 67 closing the electrical circuit and causing the alarm device to operate to attract the attention of an attendant. As soon as the overflowing of oil has been corrected oil will cease flowing through pipe 52 and the oil remaining in pan 55 will automatically drain out through opening 57 and out through discharge pipe 58 from tank 53. This draining of pan 55 permits arm 56 to disconnect said arm from contact 67, thereby stopping the operation of the signaling device. It will thus be seen that the operation and stopping of the alarm device is entirely automatic and does not have to be reset or given any attention by the attendant. The only thing required of the attendant is to stop the overflowing of oil.

The water separating and oil filtering and purifying means shown and described in this application are not claimed herein but described and claimed in my co-pending applications, Serial No. 105,350, filed June 23, 1916, for combined filter and water separator, and Serial No. 218,643, filed February 23, 1918, for oil purifying mechanism.

Obviously those skilled in the art may make various changes in the details and arrangement of parts without departing from the spirit and scope of my invention as defined by the claims hereto appended, and I wish therefore not to be restricted to the precise construction herein disclosed.

I claim:—

1. In signalling mechanism for filtering apparatus, the combination with a housing, of a lid detachably secured to said housing, an auxiliary housing secured to said lid, an electric battery in said auxiliary housing, an electric bell on said auxiliary housing, a fixed contact mounted in and insulated from said lid, a self-restoring device mounted in said first-named housing and comprising a switch arm adapted to engage said fixed contact and limit the swinging of said device when actuated by overflow from filtering apparatus, and connections for establishing an electric circuit from said battery through said electric bell and said contact and said switch arm upon overflow actuating said device.

2. In signalling mechanism for filtering apparatus, the combination with a housing, of a detachable lid therefor, a contact on said lid and electrically insulated therefrom, a switch arm in said housing in position to engage said electrically insulated contact when said lid is in closed position on said housing, means in said housing in position to be operated by overflowing liquid from filtering apparatus for moving said switch arm into engagement with said electrically insulated contact, electric signalling mechanism controlled by said switch arm and contact, and a depending flange on said lid for positioning the latter with respect to said switch arm when the lid is on the housing in closed position.

3. In signalling mechanism for filtering apparatus, the combination with a housing, of a detachable lid therefor, an electrically insulated contact mounted on said lid and removable therewith, a tiltable pan structure mounted in said housing, a switch arm connected to said pan structure to be operated thereby to engage said insulated contact on said lid, electric signalling mechanism controlled by said switch arm and contact, and flanges on said lid to engage said housing and position said electrically insulated contact with respect to said switch arm.

In testimony whereof I have signed my name to this specification on this 30th day of June, A. D. 1920.

WILLIAM W. NUGENT.